United States Patent [19]
Fantone et al.

[11] Patent Number: 5,633,753
[45] Date of Patent: May 27, 1997

[54] LOW-COST, LIGHT-WEIGHT, COMPACT BINOCULARS

[75] Inventors: Stephen D. Fantone, Lynnfield, Mass.; Arthur P. Becker, New York, N.Y.; Benjamin A. Wells, Linclon, Mass.

[73] Assignee: Mobi Corporation, Lynnfield, Mass.

[21] Appl. No.: 320,920

[22] Filed: Oct. 11, 1994

Related U.S. Application Data

[63] Continuation of Ser. No. 238,309, May 5, 1994, abandoned.

[51] Int. Cl.⁶ .................................................. G02B 23/00
[52] U.S. Cl. .......................... 359/412; 359/407; 359/409; 359/425
[58] Field of Search ...................................... 359/399–417, 359/819, 425

[56] References Cited

U.S. PATENT DOCUMENTS

| | | | |
|---|---|---|---|
| 2,284,562 | 5/1942 | Dittman | 354/155 |
| 2,424,283 | 7/1947 | Miles | 359/431 |
| 2,481,409 | 9/1949 | Glauser | 359/425 |
| 2,537,962 | 1/1951 | Brown | 359/407 |
| 2,625,854 | 1/1953 | Hayward | 359/404 |
| 3,076,382 | 2/1963 | Dowling et al. | 359/412 |
| 3,244,072 | 4/1966 | Dowling et al. | 359/412 |
| 3,409,343 | 11/1968 | Zapp | 359/431 |
| 3,690,214 | 9/1972 | Ataka | 354/225 |
| 3,829,194 | 8/1974 | Van Excel | 359/417 |
| 3,985,421 | 10/1976 | Beecher | 359/414 |
| 4,013,340 | 3/1977 | Mukai et al. | 359/417 |
| 4,013,341 | 3/1977 | Riley | 359/408 |
| 4,140,567 | 2/1979 | Beecher | 156/228 |
| 4,488,790 | 12/1984 | Beecher | 359/407 |
| 4,526,444 | 7/1985 | Fantone et al. | 359/819 |
| 4,758,077 | 7/1988 | Beecher | 359/407 |
| 4,848,887 | 7/1989 | Addy et al. | 359/413 |
| 4,955,702 | 9/1990 | Nakamura | 359/418 |
| 5,469,293 | 11/1995 | Fantone | 359/407 |

*Primary Examiner*—Thong Nguyen
*Attorney, Agent, or Firm*—Francis J. Caufield

[57] ABSTRACT

Light weight, low-cost, compact binoculars intended to be sold at retail locations and popular attractions, such as stadiums, arenas, tourist destinations, and theme parks. The binoculars utilize high reflectance mirrors to fold light and lengthen distance between the objective lens and the field lens to correct the orientation of the image. The binoculars are very light because they are made with mirrors and lightweight, injection molded acrylic plastic lenses. They are pocket sized and compact, yet adjustable for individual interocular distance. The field view is rectangular in format and the IP adjustment is by way of sliding action between nested housings made possible by virtue of the fact that the inversion and reversion functions in its separate housings are in opposite order.

32 Claims, 14 Drawing Sheets

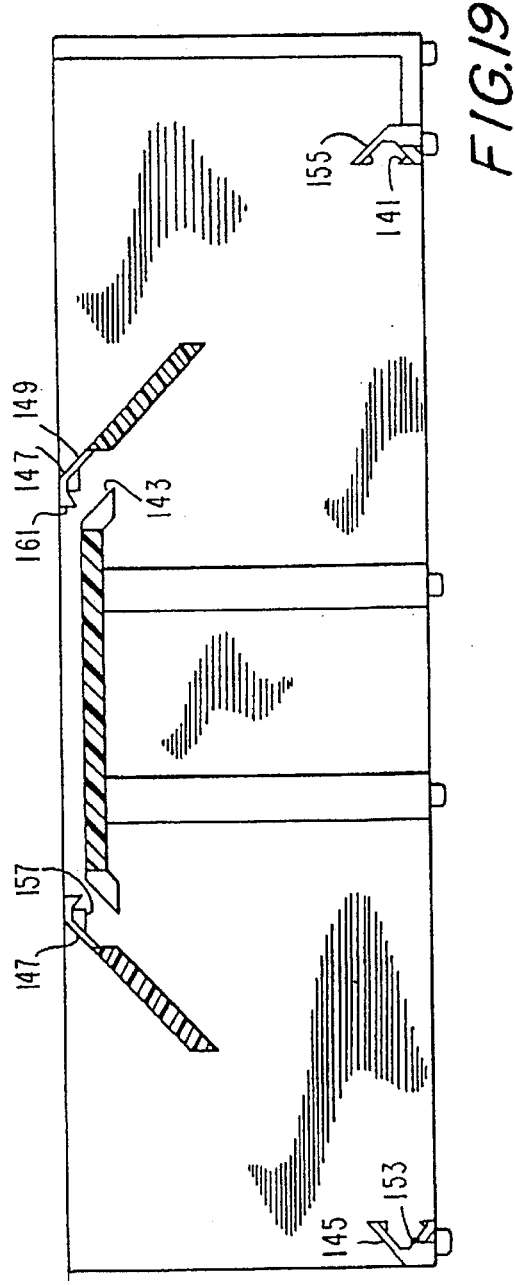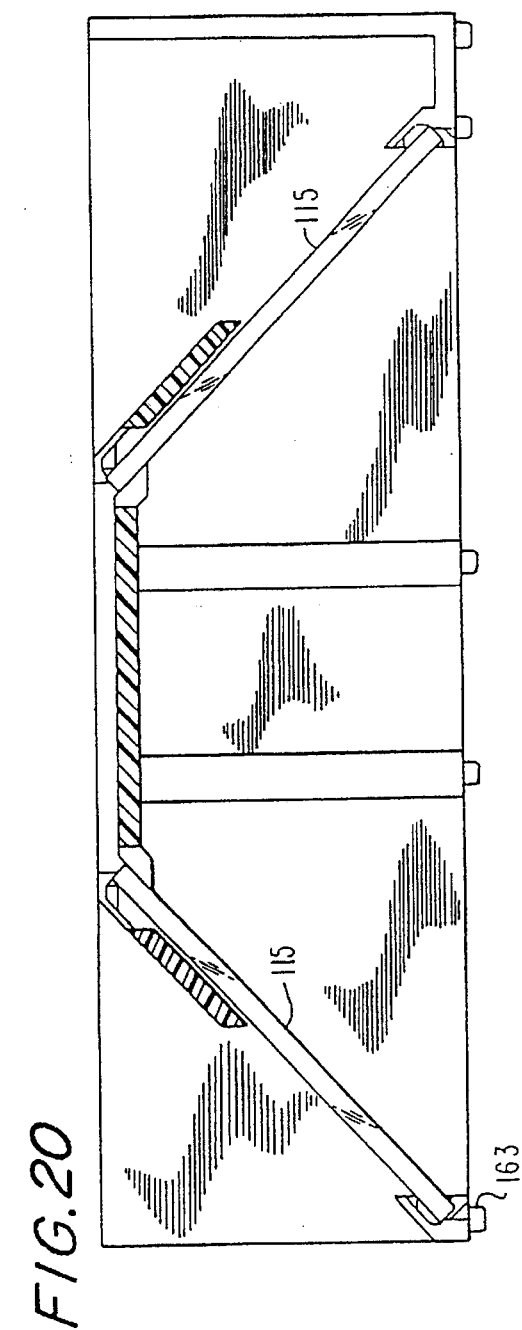

LOW-COST, LIGHT-WEIGHT, COMPACT BINOCULARS

This is a continuation of prior application Ser. No. 08/238,309 filed on May, 5, 1994, now abandoned.

BACKGROUND OF THE INVENTION

1. Field of the Invention

This invention generally relates to binoculars and, more particularly, to low-cost, light-weight, compact binoculars with adjustable interpupillary distance.

2. Description of the Prior Art

Dual-path optical systems are well-known in the optical arts and include two general classes of devices, binoculars and bioculars. Binocular devices include any instrument in which both eyes are used to view an image to achieve stereoscopic effects or to facilitate observation. They are characterized by having two mechanically linked, but optically uncoupled optical paths, to provide separate twin inputs and outputs to the visual system. True stereoscopic perspective is, more or less, commonly present in such devices so that an observer sees objects from slightly different points of view to permit the perception of depth and dimension. Prism binoculars, binocular magnifiers, and binocular microscopes are examples of such systems.

The most common biocular devices are those which are designed so that both eyes view an object through a single exit pupil, i.e., there is a single input and a twin output. They are different from binocular devices in that they contain elements that are common to both eyes. Examples of such devices include gunsights and general purpose night vision goggles such as those described in U.S. Pat. No. 4,392,710.

In both binocular and biocular devices proper image orientation and stereoscopic perspective is normally desired and achieved through the use of elaborate erecting systems in conjunction with suitable objectives and eyepieces. For example, the erecting system commonly used in standard binoculars to achieve the stereoscopic effect and proper image orientation comprises double Porto prisms in conjunction with modified Erfle eyepieces and achromatic doublet objectives. Such systems are more or less expensive and difficult to fabricate because of the tolerances required in manufacture and alignment of the various components, especially the prisms, where angular errors can be introduced at each surface.

The spectrum of known binoculars ranges from the very expensive to the very inexpensive. Prices can range from several hundred or more to under ten dollars. The high price end is represented by those which use high quality optical components that are complex in design, fabrication and testing. Such instruments are for the observer who requires excellent performance in light gathering, resolution, magnification and field coverage. They tend to be heavy to moderately heavy owing to the use of large glass components and thus are not convenient to transport. At the low end are those based on marginal designs which are made of the lowest quality components that are assembled with little care for attention to detail, quality, and performance. This class of binocular has limited utility especially where image quality is a concern, and therefore, has little value to offer. At modest prices, say under one-hundred dollars or so, there is a class of binocular that is quite good in performance and convenience. This class of binocular is quite valuable but still is not something that most people would tend to carry with them unless they specifically plan on their use. Consequently, there is a need for a binocular that may be retailed to a large segment of the population for use at popular attractions such as theater, concert, and sporting events, and it is a primary object of this invention to provide such binoculars.

It is another object of the present invention to provide low-cost, compact, and light-weight binoculars that can be adjusted to match the range of interpupillary distances of intended users.

Another object of the present invention is to provide a low-cost binocular system that can have interpupillary distance adjusted by a simple sliding action.

Yet another object of the present invention is to provide a low-cost binocular system that has a rectangular field of view and an adjustable interpupillary distance.

Still another object of the present invention is to provide a low-cost binocular system that folds into a compact configuration for convenience of storage and transport.

Another object of the present invention is to provide a low-cost binocular architecture that can be easily modified to provide a range of externally similar binoculars of different magnification.

Still another object of the present invention is to provide a series of optical designs for use in low-cost binoculars.

Yet another object of the present invention is to provide easily adjustable binocular designs that utilize four-mirror assemblies in each eye path for providing correct image orientation.

Other objects of the invention will be apparent and will appear hereinafter as will be evident from the following detailed description when read in connection with the accompanying drawings.

SUMMARY OF THE INVENTION

The invention relates to low-cost, compact, light-weight binocular architectures that in preferred form have rectangular fields of view and interpupillary adjustments that can be made with simple sliding mechanical motions to accommodate a wide range of users.

The preferred forms comprise nested, complementary configured, L-shaped housings, each of which includes a four-mirror erecting arrangement along with associated objective and eyepiece lenses that operate as fixed focus optical systems. The L-shaped housings are mechanically linked together for precise adjustment of interpupillary distance but are otherwise optically uncoupled in that each represents an independent optical path for each eye, not sharing any optical components with the other.

The four mirrors in each optical path operate to invert and revert its respective image of object space so that the final image is properly oriented but the order of inversion and reversion in the preferred form is reversed. That is, the image is inverted and then reverted in one path, and reverted and inverted in the other. In both paths, however, the distance separating the reverting mirrors is preferably the same and longer than the distance separating the inverting mirrors, and perpendicular to the entering and emerging optical axes of both paths. In addition, the preferred embodiments have both of the reverting mirror sections positioned to the same side of the objectives.

As a consequence of the overall architecture, mirror arrangements, and size of optical lens elements used, the interpupillary distance is adjustable with a linear sliding action while at the same time maintaining proper optical alignment between the otherwise uncoupled optical paths corresponding to the left and right eyes.

3

The housing architecture and optical designs also permit the use of different combinations of differently designed objectives and eyepieces to provide binoculars of different magnification while still utilizing the same basic housing elements.

Importantly, provision is made for movement of one or more of either the objectives or eyepieces to provide for proper alignment between the left and right eye paths.

DESCRIPTION OF THE DRAWINGS

The structure and operation of the invention, together with other objects and advantages thereof, may best be understood by reading the detailed description in connection with the drawings in which reference numerals have been used throughout to designate the same part and wherein:

FIGS. 19 and 20 are cross-sectional details of horizontal mirror mounts, showing the integrally molded members and the mirrors mounted within the integrally molded members;

4

Figure 26:
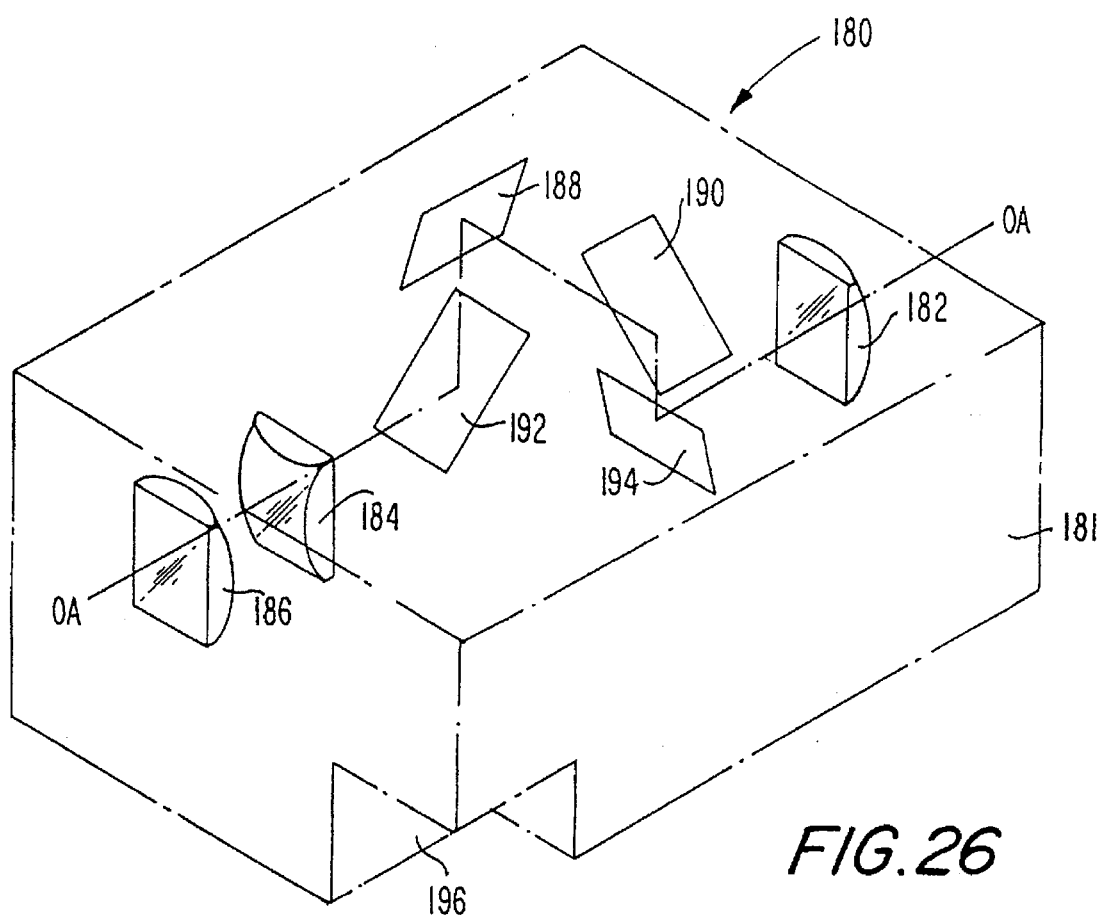
Figure 27:
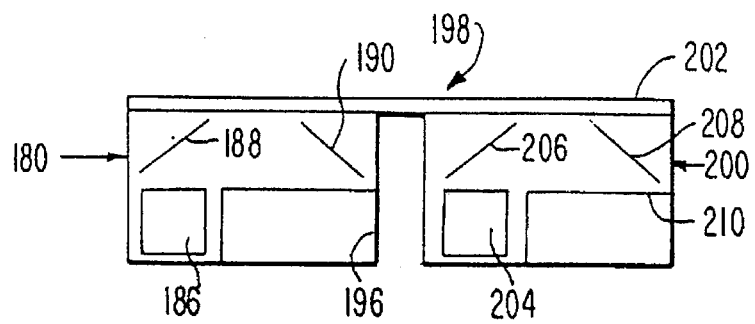

FIG. 26 is a diagrammatic perspective view, with parts shown in phantom, of one-half of an alternative binocular system showing the arrangement of its optical components; and FIG. 27 is a diagrammatic rear elevational view of an alternative embodiment of the invention, showing the use of two housings each of which has an optical system such as that shown in FIG. 26 except that the half on the right is a mirror image of the one on the left.

DETAILED DESCRIPTION

Figure 1:
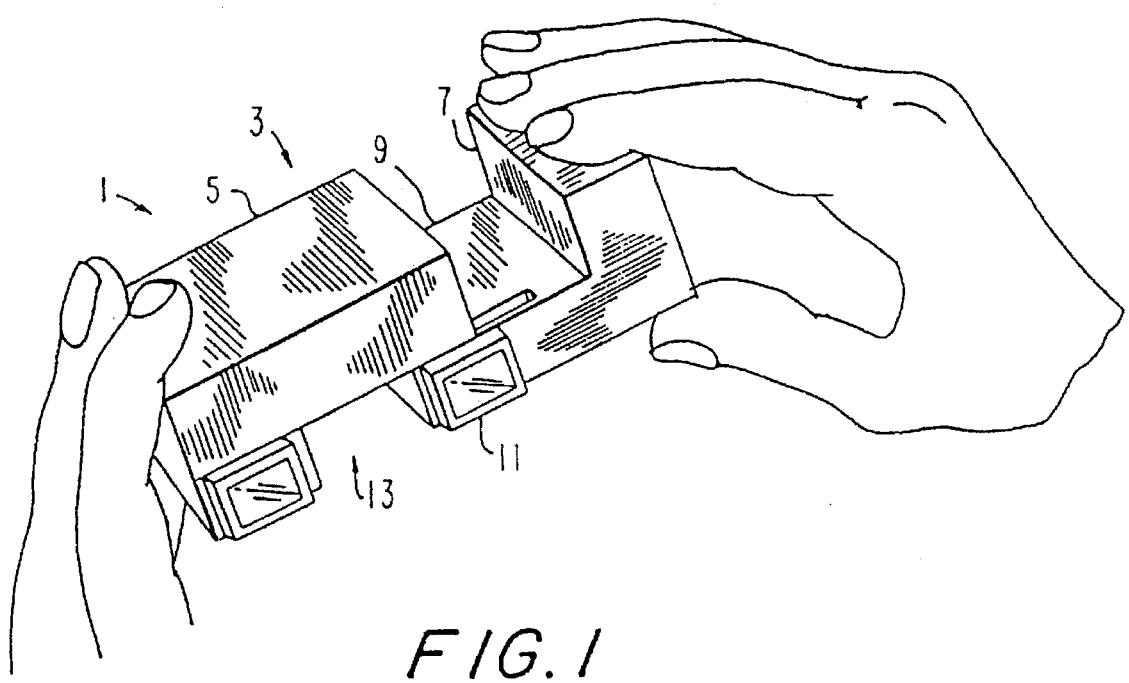
FIG. 1 shows a diagrammatic, perspective view of a binocular according to the invention shown in its extended, operative position.
Figure 2:
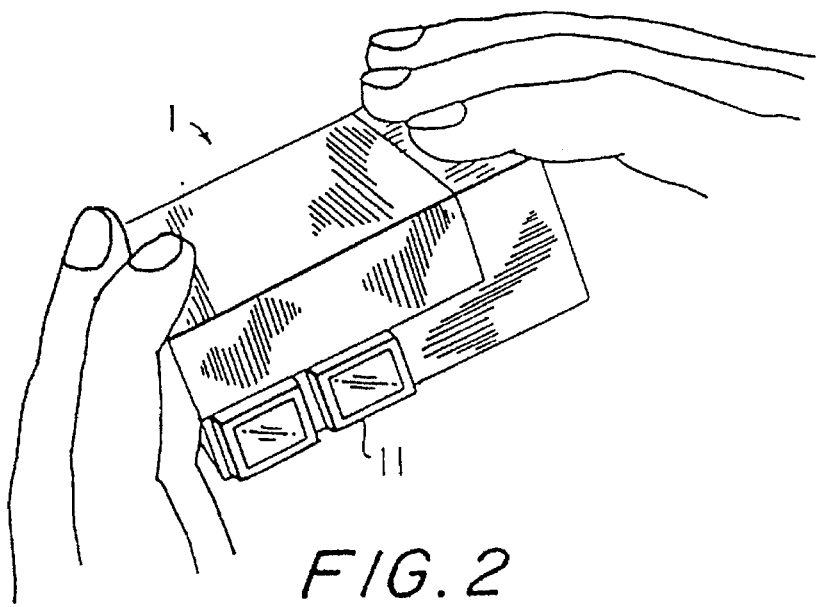
FIG. 2 shows the binocular of FIG. 1 in its compact carrying mode.

Referring to FIGS. 1 and 2, a preferred embodiment for a binocular according to the invention is generally indicated by the numeral 1. Binocular 1, which is seen from the perspective of a user, has a two-part slidable housing generally indicated by the numeral 3. Housing 3 comprises nesting, L-shaped assemblies 5 and 7, connected in a manner to be described by an intermediate plate 9. A pair of eyepiece holders 11, which contain eyepieces for observing intermediate images formed by upstream objective lenses on the object side of binocular 1, extend rearwardly from the back of assemblies 5 and 7.

As shown in FIG. 1, L-shaped, box-like optical assemblies 5 and 7 slide apart on the intermediate plate 9, providing a clearance space 13 for the nose of the user while spacing the eyepieces apart at an appropriate distance to match the interocular distance separating the user's eyes. Intermediate plate 9 maintains the extended structure rigidly in place, while frictionally holding the optical assemblies 5 and 7 in the selected position to maintain precise parallel alignment of the optics.

FIG. 2 shows assemblies 5 and 7 slid together in their nested, closed position.

Figure 3:
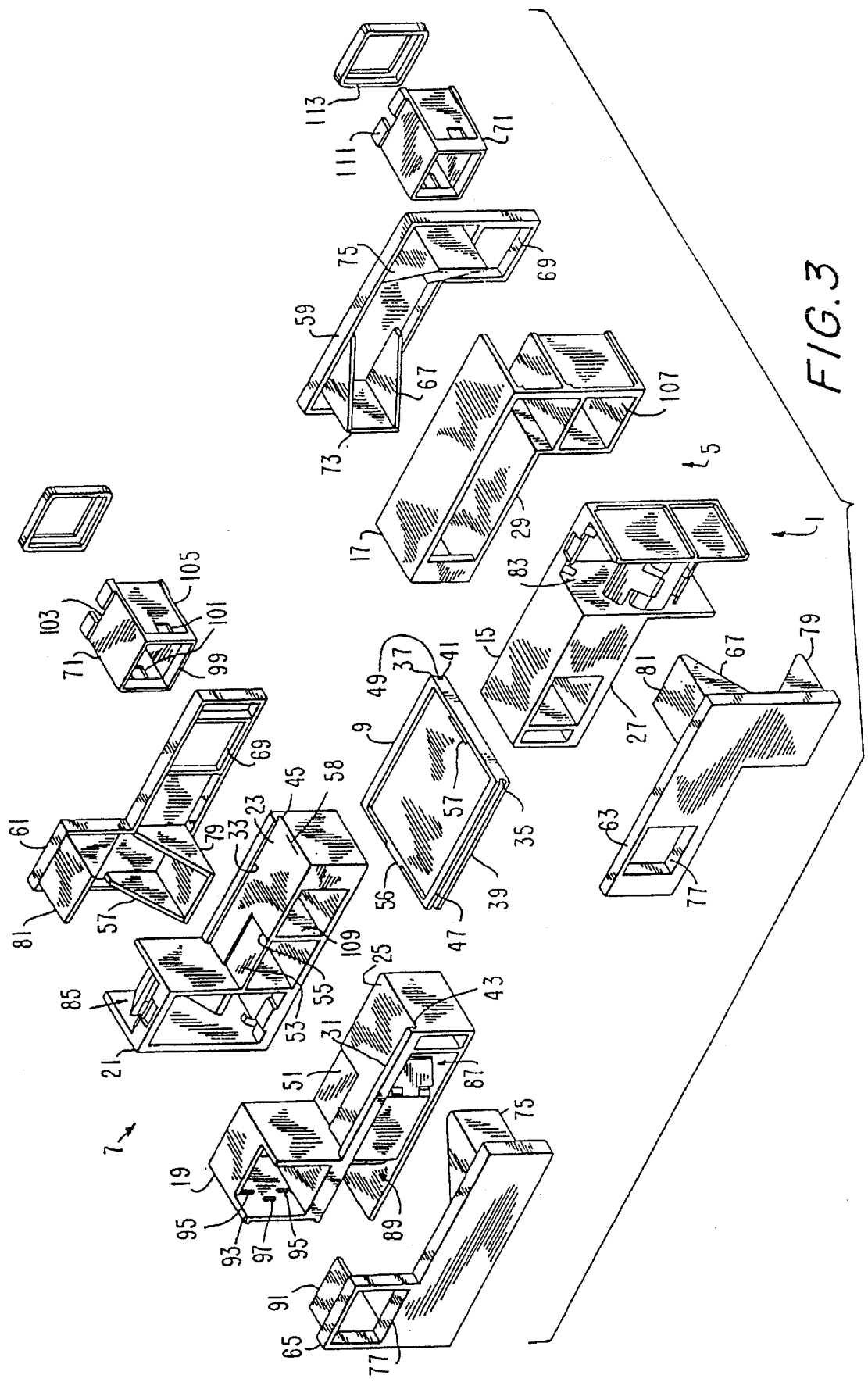
FIG. 3 is an exploded, perspective view of the housing components of the binocular of FIG. 1 absent its optical elements.

Reference is now made to FIG. 3 which shows various interrelated parts of binocular 1 in exploded perspective. The optical elements of binocular 1 have been omitted from FIG. 3 (and FIG. 4) for a clearer depiction of the housing features, but as will be seen, comprise an objective, four mirrors, which perform erecting functions, and a two-element eyepiece for each assembly, 5 and 7. Assembly 5 is made of two shells 15 and 17, which are abutted and joined together along edges by bonding, welding, snapping, or mechanical interfitting, or the like. Assembly 7 is made up of a front shell 19 and a rear shell 21.

Intermediate plate 9 is laid on flat upper surfaces 23 and 25 of the shells 19 and 21, respectively, before or after they are joined, and lower flat surfaces 27 and 29 of shells 15 and 17, respectively, are laid on the intermediate plate 9 before or after those shells are joined. Thus, intermediate plate 9 is trapped between the shells and between the left and right subassemblies of assemblies, 5 and 7.

Inward facing rails 31 and 33 on assembly 7 engage the lower halves of grooves 35 and 37 on edges of the intermediate plate 9. Rails 39 and 41 of intermediate plate 9 extend, respectively, into grooves 43 and 45 beneath the rails 31 and 33 on shells 19 and 21. Upper rails 47 and 49 of intermediate plate 9 fit within recesses beneath inward projecting rails on lower edges of shell sections 15 and 17. Recesses 51 and 53 fit together, forming a wall 55 which restricts movement of a projection at the end of the underside of intermediate plate 9. A similar projection, 57, on the top of the plate 9 cooperates with a similar wall at the end of a similar recess on the underside of elements 15 and 17 to limit outward travel between assemblies 5 and 7, and thus set the outer limit of interocular adjustment.

After the shells have been connected to the intermediate plate 9 and secured together, the binoculars are completed by systematically inserting mirrors and lenses and assembling the various optical elements. Forward facing mirrors are inserted in the back of the assemblies. Contour plate 59 is added as a rear cover plate of optical assembly 5. Contour plate 61 is added as a rear contour plate cover of optical assembly 7.

The rear facing edge surfaces of the shells are bonded, welded, or mechanically snapped to the forward facing edge surfaces of rear contour plates 59 and 61. Then, rearward facing mirrors are placed in the front of optical housings 5 and 7, and the front contour plate covers 63 and 65 are added.

Contour plates 59, 61, 63, and 65 have openings for optics and have rigid triangular box-like projections with edges 67, which rest against edges of backs of the mirrors and hold the mirrors in precise positions within the optical assembly shells.

Rear contour plate 59 has an opening 69, through which eyepiece holder 71 slides. The two triangular box-like projections 73 and 75 support angled mirrors which have a horizontal light path between them in shell 17. Edges 67 contact those mirrors. Contour plate 63 has an opening 77, which serves as the light emitting entrance to an objective lens mounted in shell 15. Rigid box-like triangular structures 79 and 81 have edges 67, which rest against the mirrors mounted in holders 83 in shell 15, which mirrors have a vertically oriented light path between them.

Rear contour plate 61 has similar triangular box-like sections 79 and 81, with sloped edges 67 which rest against vertical light path mirrors held in mirror mounts 85 in shell 21. An opening 69 allows the inward sliding of an eyepiece lens holder 71. Front contour plate 65 has a triangular box-like projection 75 with edges which support mirrors in mounts 87 and 89 in shell 19. A projection 91 extends rearward from the light path opening 77 in contour plate 65 to cover the opening 93 in the shell after an objective lens is inserted between fixed holders 95 and 97. The holders 95 and 97 hold edges of an objective lens and allow the lens to be moved vertically for precise optical path adjustment before the lens is fixed in place, such as by bonding.

Eyepiece holders 71 have openings 99, through which field lenses and ocular lenses are inserted. Openings 101 and 103 hold tabs which project from the lens. Surfaces 105 are constructed without taper for engaging inner surfaces of the rectangular openings 107 and 109. Flanges 111 snap into grooves 113 in eyepieces covers 11. Eyepiece holders 71 are also moveable along their respective optical axes to adjust or set focus of the binocular system.

Figure 4:
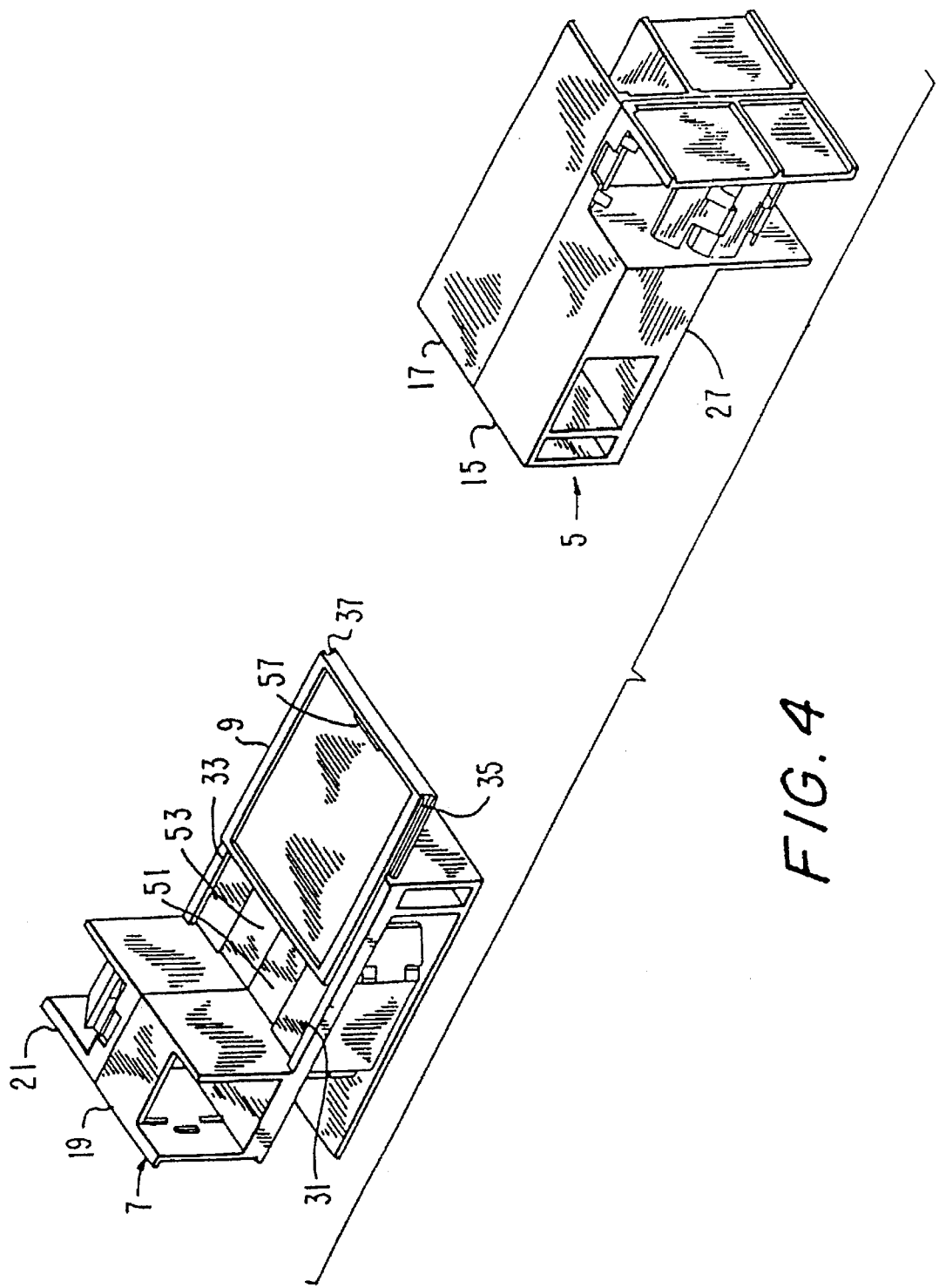
FIG. 4 is a diagrammatic, exploded perspective view of the binocular of FIG. 1 shown with missing parts but showing its sliding mechanism for adjusting interpupillary distance.

FIG. 4 shows the initial assembly steps by which shells 15 and 17 are bonded, welded, or snapped together in permanent interconnection and by which intermediate plate 9 engages the rails 31 and 33 on the flat surface of assembly 7. Similar inward facing rails mounted on the lower surfaces 27 and 29 of the shells in assembly 5 engage grooves 35 and 37 in the intermediate plate above rails 31 and 33. Projection 57 snaps into position in a recess similar to recesses 51 and 53 in assembly 7. Walls 55 cooperate with detents 57 to limit outward extension of assemblies 5 and 7. Detents 56 snap into grooves 58, as shown in FIG. 3, to hold assemblies 5 and 7 together when binocular 1 is stored.

Figure 5:
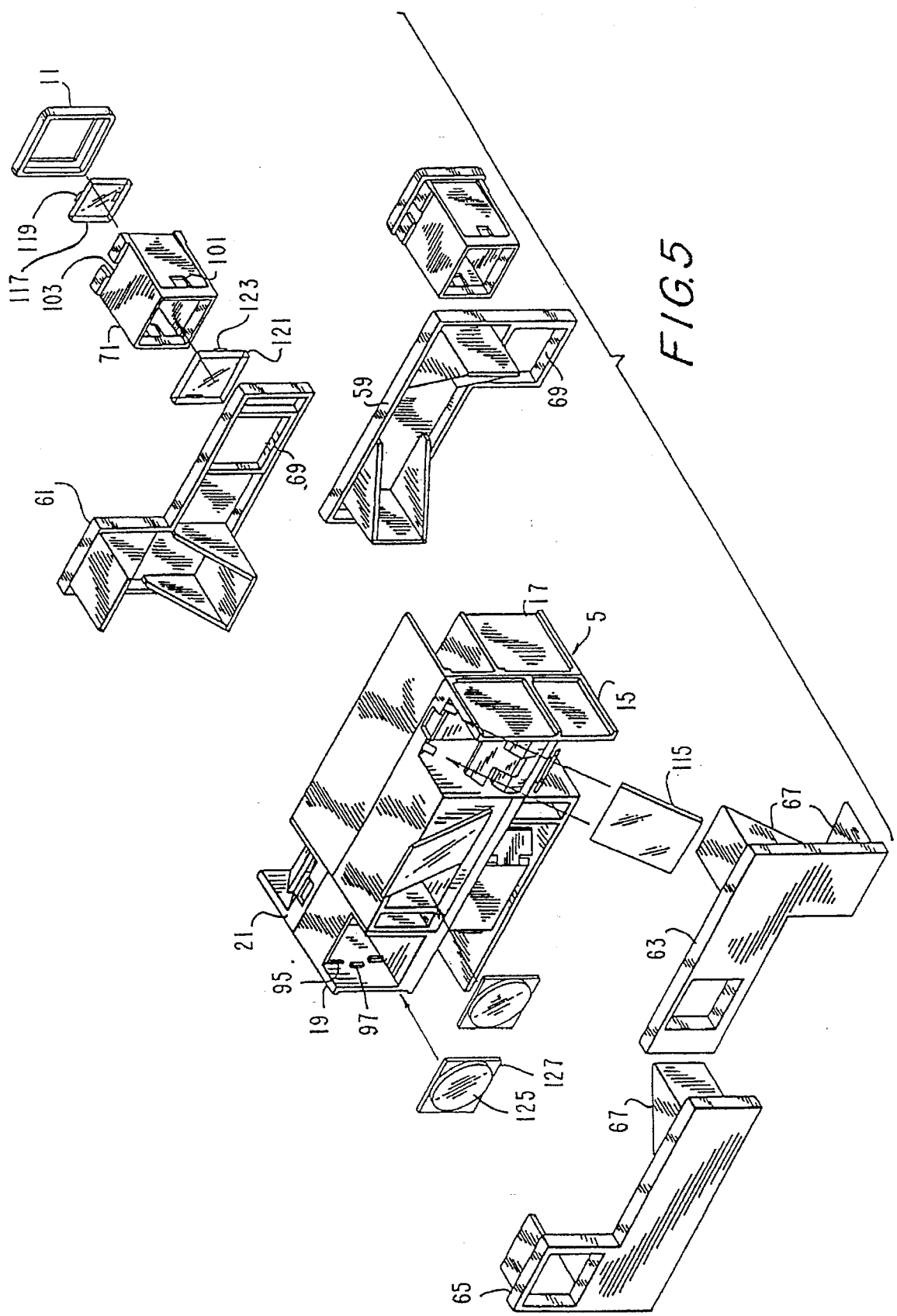
FIG. 5 is an exploded, diagrammatic perspective view of the binocular of FIG. 1 showing its optical elements in combination with the major housing assemblies.

FIG. 5 depicts subsequent steps of inserting lenses and mirrors and connecting contour plates after the optical assemblies 5 and 7 have been joined.

Four plane mirrors as those indicated at 115 are placed in shells 17 and 21. Shell 17 receives mirrors with a horizontal intermediate light path, and shell 21 receives mirrors with a vertical intermediate light path. The contour plates 59 and 61 are then bonded, welded, or snapped to rearward edges of shells 17 and 21. Two additional mirrors, again like mirrors 115, are slid into place in each of shells 15 and 19. Shell 15 receives the mirrors with a vertical intermediate light path, and shell 19 receives the mirrors with a horizontal intermediate light path.

Ocular lenses 117 with projections 119 are slid into holders 71. Tabs project from openings 103. Then eyepiece covers 11 are inserted on the holders. Field lenses 121 with projecting tabs 123 are inserted in holders 71. The tabs 123 extend through the openings 101. The lenses are fixed in place by bonding or snapping into place or mechanically holding the lenses and tabs in place. Then the holders are pushed through openings 69 into the rectangular recesses in shells 17 and 21. Objective lenses 125 with integral frames 127 are positioned between the holders 95 and 97. Objective lenses are positioned precisely in optical alignment and are bonded or otherwise fixed in place. Finally the front contour plates 63 and 65 are added. The edges 67 of the triangular box-like projections contact rear edge surfaces of the mirrors 115 and tightly hold the mirrors against fixed reference surfaces in the shells.

Figure 6:
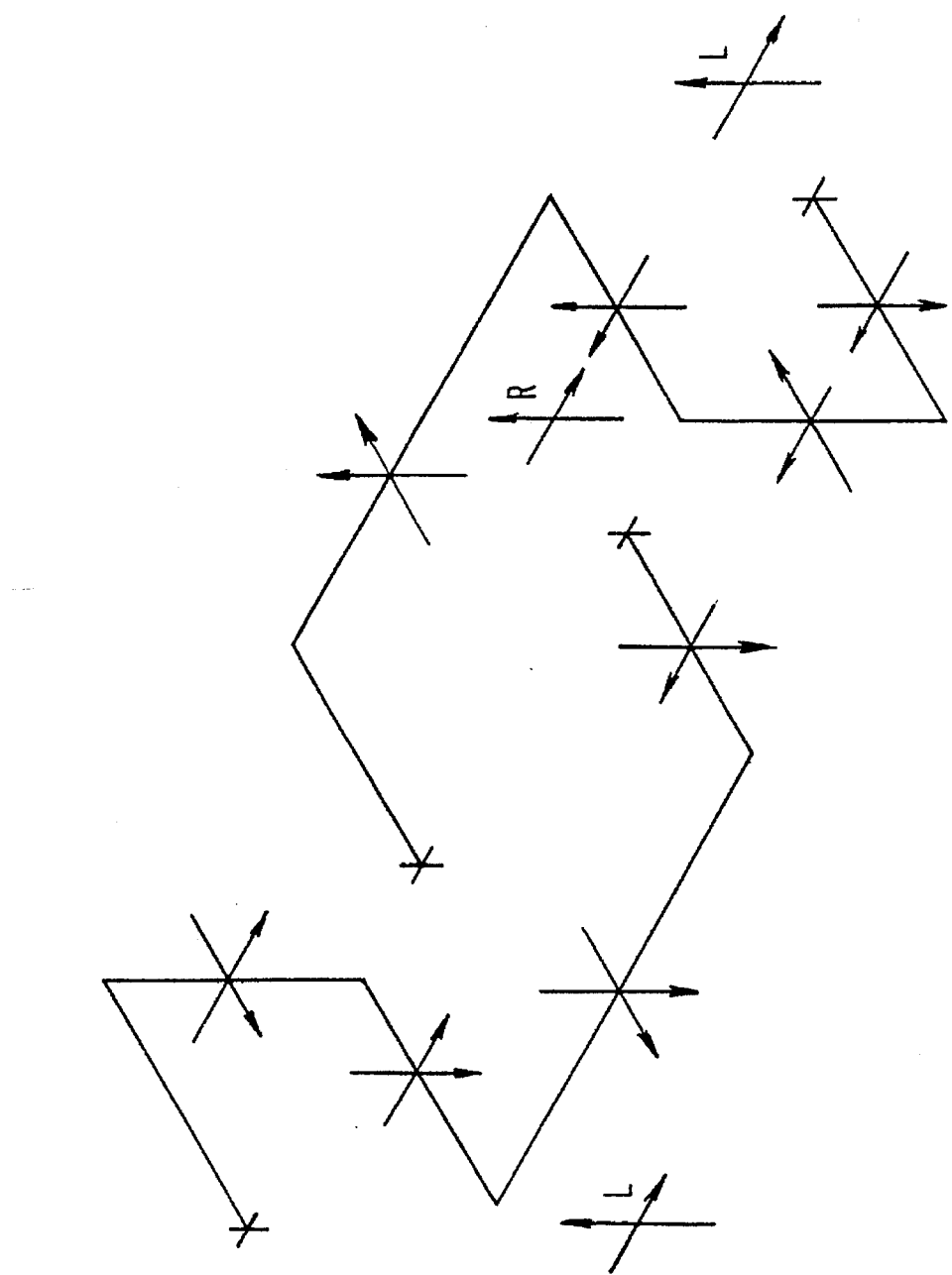
FIG. 6 is a diagrammatic perspective of the optical axes of the two folded optical paths for the left and right eye of the binocular of FIG. 1.

FIG. 6 shows the folded, nested optical paths for assemblies 5 and 7 as a result of the foregoing housing architecture and use of optical elements. As can be seen there is a multiply folded optical path for both the left and right eye. In each case, the image orientation of an object as seen by a user is upright and properly oriented left to right. As will be noticed, however, the order in which image inversion and reversion takes place is reversed for the right and left paths. In the right path, the image is first inverted and then reverted by its dual pair of four plane mirrors, and in the left path, it is first reverted and then inverted. In both cases, however, the reversion mirrors have a longer separation distance between them than the inverting pairs, are horizontally oriented, and lie on the same side of the objectives. In the right eye path, the inverting mirrors are to the back and facing object space while in the left eye path, they are in the front and facing image space. The various arrows show how left and right object perspectives are inverted and reverted as they travel through binocular 1.

Each of the right and left eye optical paths includes a path portion which is in a plane parallel to the rectilinear path of relative housing movement to adjust the interocular distance. The horizontal path portion for the right eye is in a plane that passes through the objective lenses 125, whereas the horizontal path portion of the left eye is in a plane that passes through the eyepiece lenses 71. Further, the optical axis of each of the eyepiece lenses 71 is in a plane extending parallel to the rectilinear path of housing movement and spaced from the plane containing the optical axis of each of the objective lenses 125. Thus, the housings 5 and 7 can be reciprocally moved and supported between the initial stored position of FIG. 2 and a selected extended position as shown in FIG. 1 in which the optical axes of the respective eyepiece lenses 71 are arranged in proper alignment with the ocular spacing of a user's eyes, and the optical axes of the objective lenses 125 are arranged in proper position for stereoscopic viewing of the object being observed.

With the arrangement shown, the right eye objective may be vertically shifted prior to final bonding to match the vertical location of the left eye optical path and the left objective horizontally adjusted prior to final placement moved to match the horizontal location of the right eye optical path. In this way, a simple and expedient system results for adjusting final vertical and horizontal alignment between right and left optical paths to compensate for alignment errors between the various mirrors comprising their erecting arrangements. Alternatively, such adjustment may take place via adjustment of the eyepieces as well.

Figure 7:
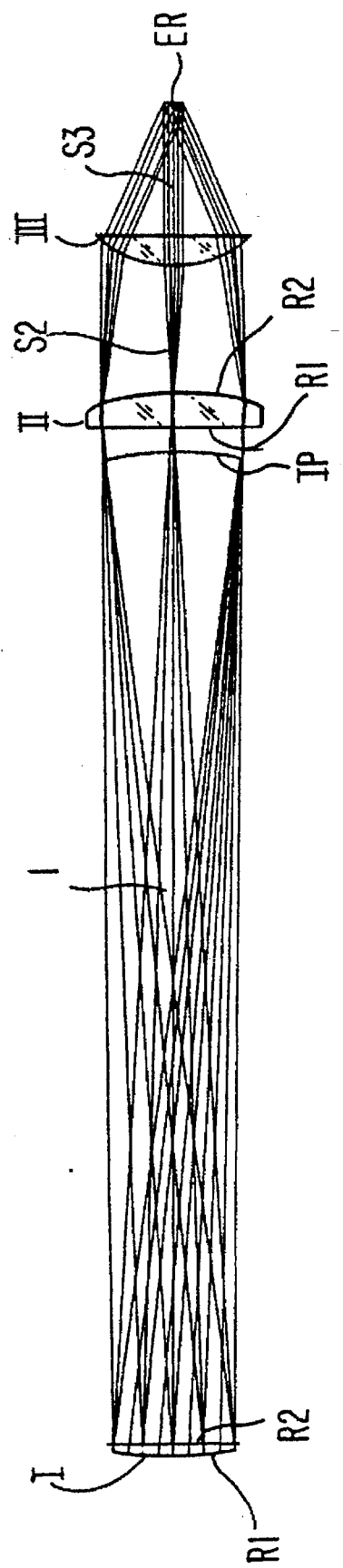
FIG. 7 is a diagrammatic elevational view which generically represents unfolded optical systems used in the invention.

An additional feature of the invention relates to the use of objectives and eyepieces of different optical design to provide binoculars of different magnification and angular field coverage while using the same basic housing architecture. By careful design and placement of the objective and eyepiece elements in the various housings which carry them, it is a relatively easy matter to provide for the use of different combinations of objective and eyepiece elements to achieve this. The following examples will serve to illustrate this feature with reference to FIG. 7.

EXAMPLE 1 - A Binocular of 6× Magnification and An Angular Field of +/− 4.0 Degrees (All Dimensions in mm)

|     | R1       | R2      | t     | n      | Material |
|-----|----------|---------|-------|--------|----------|
| I   | 71.65    | −548.85 | 1.665 | 1.4917 | Acrylic  |
| II  | 0.0      | −36.38* | 4.0   | 1.4917 | Acrylic  |
| III | 11.605** | 0.0     | 5.0   | 1.4917 | Acrylic  |
| S1  | 131.14   |         |       |        |          |
| S2  | 16.12    |         |       |        |          |
| S3  | 16.996   |         |       |        |          |

*Aspheric with a conic constant of 4.00
**Aspheric with a conic constant of −0.931
Distance to Intermediate image, IP, = 127.53

EXAMPLE 2 - A Binocular of 5.25× Magnification and An Angular Field of +/− 4.54 Degrees (All Dimensions in mm)

|     | R1      | R2      | t     | n      | Material |
|-----|---------|---------|-------|--------|----------|
| I   | 63.08   | −483.00 | 1.466 | 1.4917 | Acrylic  |
| II  | 0.0     | −36.89* | 4.0   | 1.4917 | Acrylic  |
| III | 11.60** | 0.0     | 5.0   | 1.4917 | Acrylic  |
| S1  | 115.879 |         |       |        |          |
| S2  | 16.12   |         |       |        |          |
| S3  | 17.485  |         |       |        |          |

*Aspheric with a conic constant of 4.00
**Aspheric with a conic constant of −.093
Distance to Intermediate image, IP, = 112.28

EXAMPLE 3 - A Binocular of 7.5× Magnification and An Angular Field of +/− 2.00 Degrees (All Dimensions in mm)

|     | R1     | R2      | t    | n      | Material |
|-----|--------|---------|------|--------|----------|
| I   | 71.65  | −548.85 | 1.66 | 1.4917 | Acrylic  |
| II  | 0.0    | −72.58* | 4.0  | 1.4917 | Acrylic  |
| III | 8.18** | 0.0     | 4.0  | 1.4917 | Acrylic  |
| S1  | 130.2  |         |      |        |          |
| S2  | 11.78  |         |      |        |          |
| S3  | 18.19  |         |      |        |          |

*Aspheric with a conic constant of −3148.95
**Aspheric with a conic constant of −1.3338
Distance to Intermediate image, IP, = 127.5

EXAMPLE 4 - A Binocular of 6.5× Magnification and An Angular Field of +/− 3.8 Degrees (All Dimensions in mm)

|     | R1     | R2      | t    | n      | Material     |
|-----|--------|---------|------|--------|--------------|
| I   | 75.30  | −576.78 | 1.75 | 1.4917 | Acrylic      |
| II  | 200.00 | −40.0   | 4.0  | 1.4917 | Acrylic      |
| III | 11.4*  | −400.0  | 5.0  | 1.4917 | Molded Glass |

-continued

EXAMPLE 4 - A Binocular of 6.5× Magnification and An Angular Field of +/− 3.8 Degrees (All Dimensions in mm)

|    | R1      | R2 | t | n | Material |
|----|---------|----|---|---|----------|
| S1 | 137.314 |    |   |   |          |
| S2 | 15.877  |    |   |   |          |
| S3 | 15.657  |    |   |   |          |

*Aspheric with a conic constant of −1.0
Distance to Intermediate image, IP, = 134.250

In the design of the various examples, there is a physical limitation imposed by what is considered a tolerable overall size which in turn sets the size of allowable clear aperture masks. For a given size objective field mask, it is the focal length of the objective that determines the angular field coverage. Once this has been determined, the ratio of the focal lengths of the objective and eyepiece determine the overall magnification. If one starts with, say, a nominal focal length for the objective of 129 mm and assumes a focal length variation in it of +/−15 mm, this range will in turn set the range of angular field coverage. One can then adjust the focal length of the eyepiece within this range to set the magnification. This is done by adjustment of the shapes and placements of the various lens elements.

The eyepieces of the examples are all modified Ramsden forms that have been aspherized to enhance performance and increase image sharpness, particularly to reduce pupil aberrations and keep the distortion at tolerable levels of less than 3%. Although Ramsden variants have been used because they provide an accessible intermediate mask at an intermediate plane, the slightly curved image plane, other well-known higher performing forms, such as, for example, Kellners or Erfles, may also be used if higher performance is desired. As the present examples exist, however, they provide accommodated RMS blurs less than 1.0 milliradians on-axis and over substantially all of the field. Lateral color is not corrected but is tolerable, and the aspherics operate in combination to reduce distortion, pupil, and image aberrations.

In each example, the distances between the various mirrors remains unchanged but the axial placement of the objectives and eyepiece lenses in their respective housings is altered slightly to cause the necessary optical effect. Thus, the various tabs for receiving the optical lens elements need only be decided on in advance to make provision for receiving a series of objectives or eyepiece lenses at different axial locations to assure proper axial separation for the corresponding desired magnification. If need be, the rectangular apertures in the various housings can also be provided with different sized openings to accommodate the angular field of view coverage for each design of different magnification.

Figure 8:
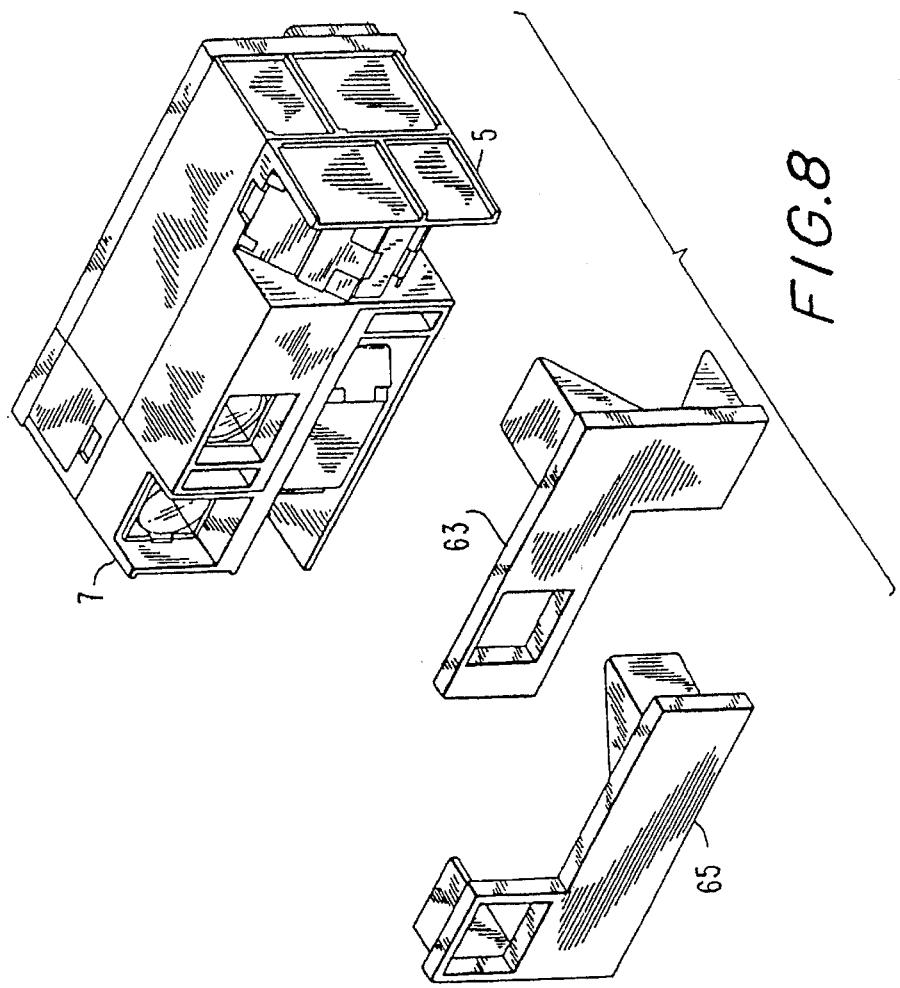
FIG. 8 is a diagrammatic, perspective view showing the final assembly of the front contour plates of the binocular of FIG. 1.
Figure 9:
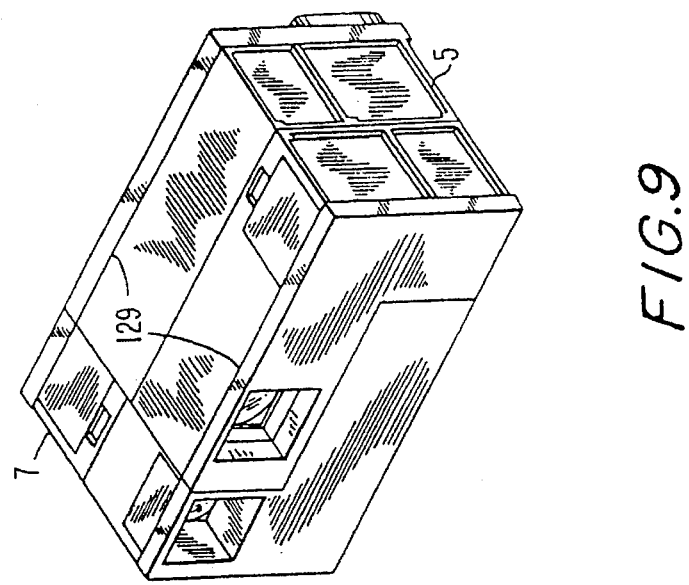
FIG. 9 is a diagrammatic, perspective view of the assembled binocular.

FIG. 8 shows the final assembly step in which contour plates 63 and 65 are added to the otherwise completed assemblies, and FIG. 9 shows the completed binocular 1. The contour plates 59, 61, 63, and 65 have lips 129 which extend around each assembly 5 and 7.

Figure 11:
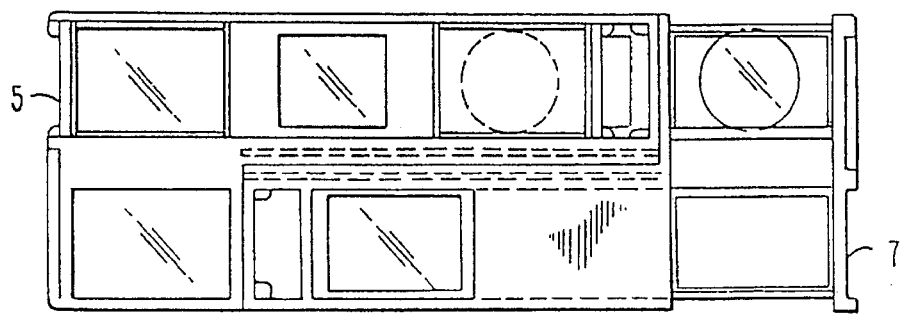
FIG. 11 is a diagrammatic, elevation view of the optical assemblies of the binocular of FIG. 1 shown slid together for carrying.
Figure 10:
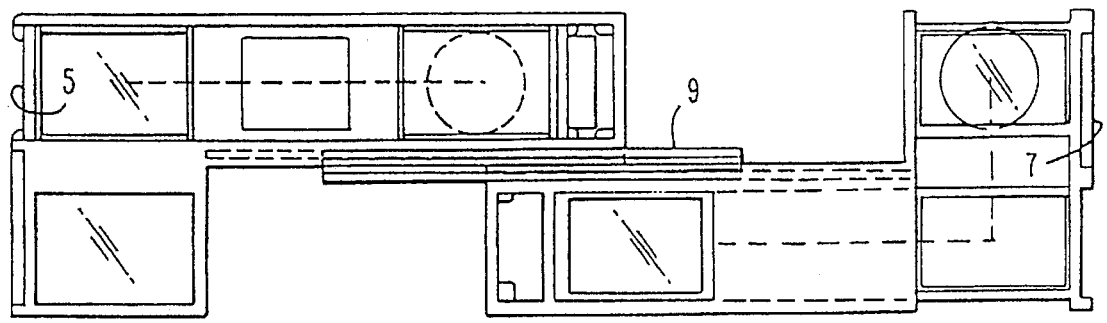
FIG. 10 is a diagrammatic, elevational view of the connected and extended optical assemblies of the binocular of FIG. 1.

FIG. 10 shows the assembled elements in expanded condition, and FIG. 11 shows the binocular in compact stored position.

Figure 13:
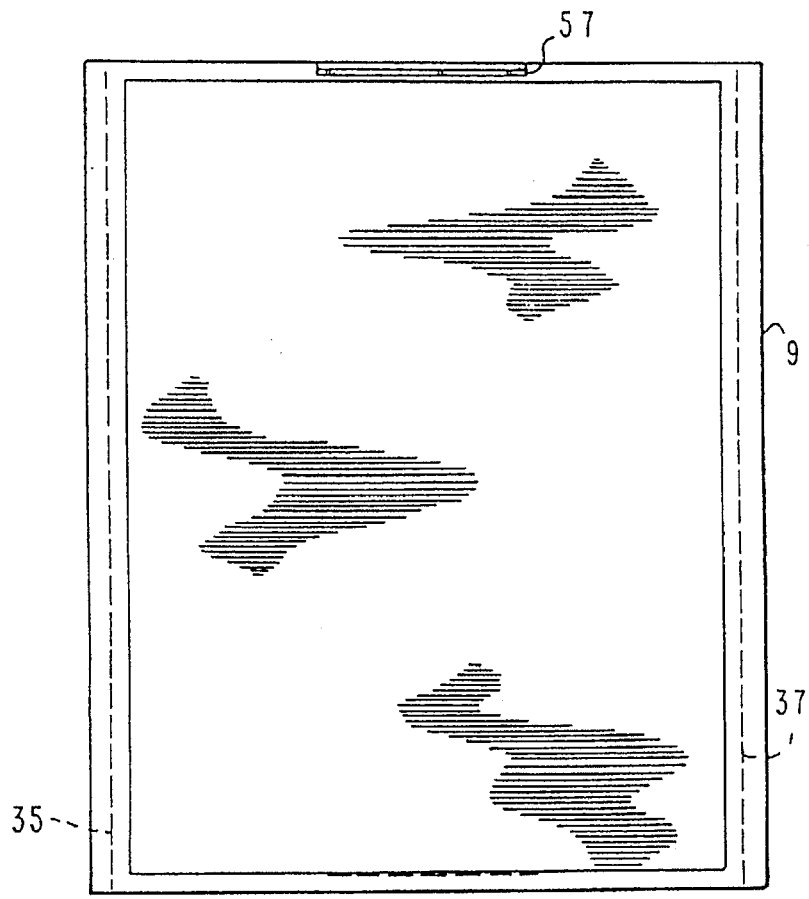
FIGS. 12, 13, and 14 are orthographic views of an intermediate plate, a side elevation, a top plan and an end elevation, respectively.
Figure 12:
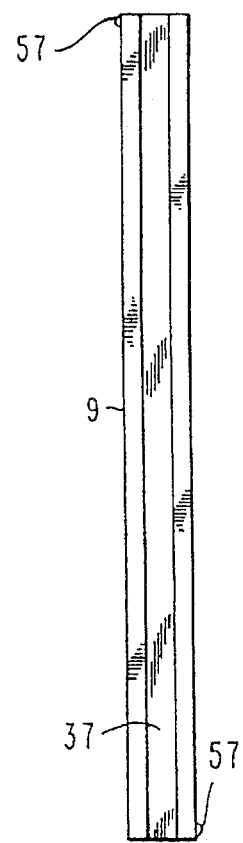
Figure 14:
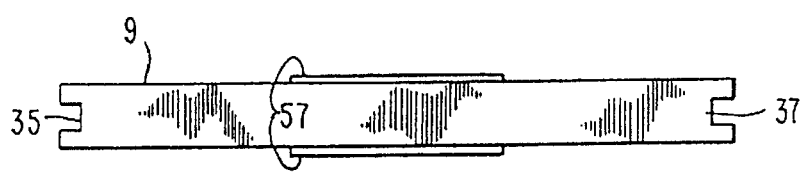
Figure 15:
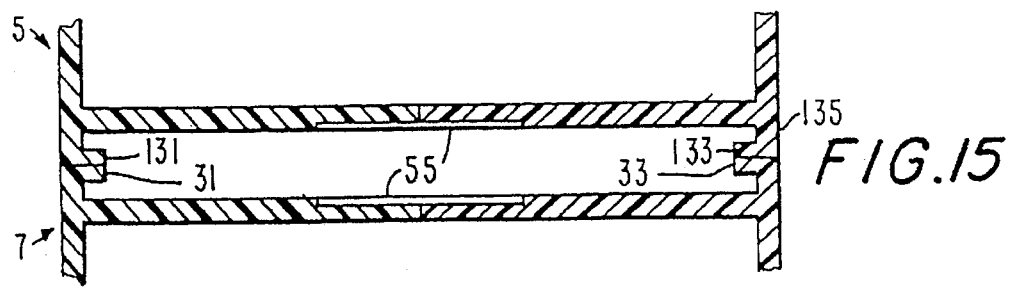
FIG. 15 is a detail of a portion of the optical assemblies of the binocular of FIG. 1.

FIGS. 12, 13, and 14 are details of intermediate plate 9, and FIG. 15 shows the rails 31 and 33 on the optical assembly 7 and the complementary rails 131 and 133 on the optical assembly 5, which fit together with a frictional interface and which are held together by the grooves 35 and 37 between the outward extending rails on the intermediate plate 9.

The projections 57 on ends of the intermediate plate engage the walls 55 of the recesses to prevent overextension of the optical assemblies 5 and 7.

Figure 16:
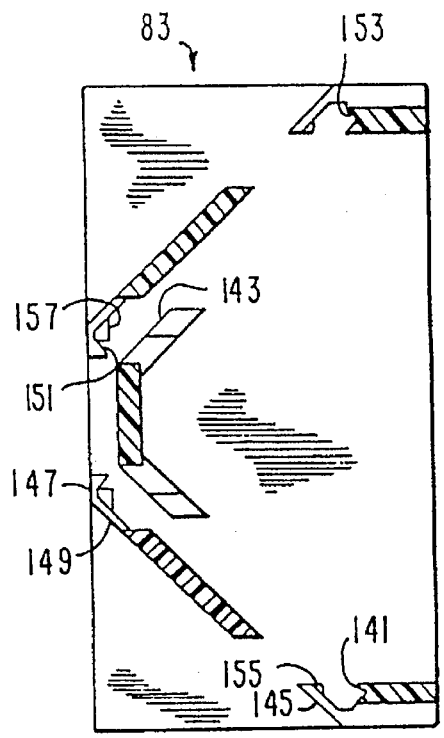
FIGS. 16, 17, and 18 are cross-sectional details of vertical mirror mounts, showing their integrally molded parts, the sliding of the mirrors into the molded parts, and the holding of the mirrors, respectively.
Figure 18:
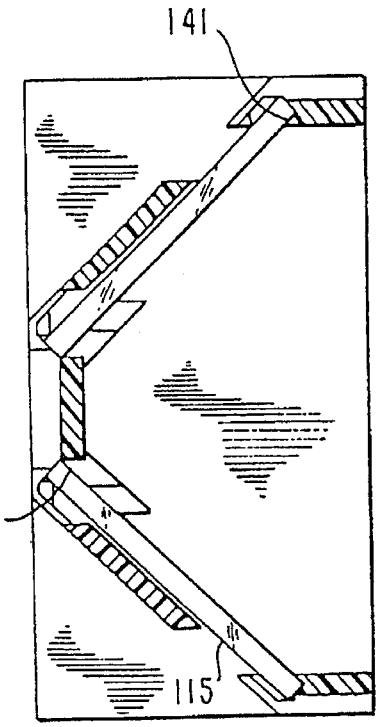
Figure 17:
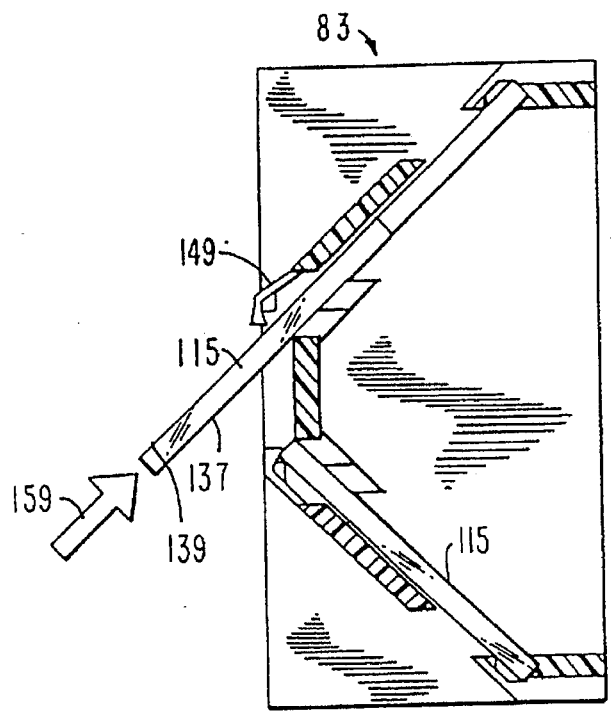
Figure 21:
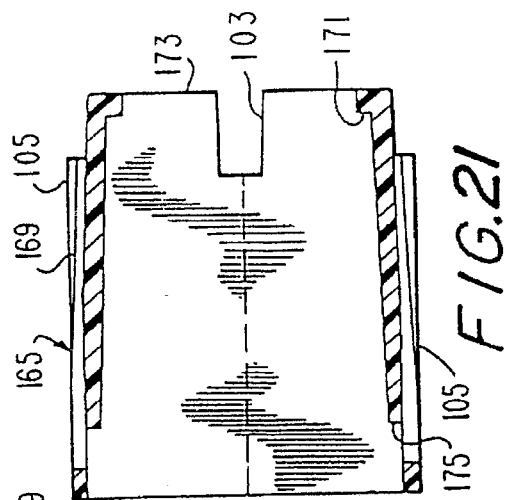
FIGS. 21, 22, 23, and 24 are orthographic projections of an eyepiece holder, showing, respectively, a cross-sectional top view, and end view, a top view and a side elevation.
Figure 22:
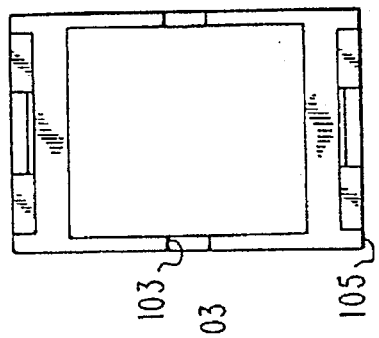
Figure 24:
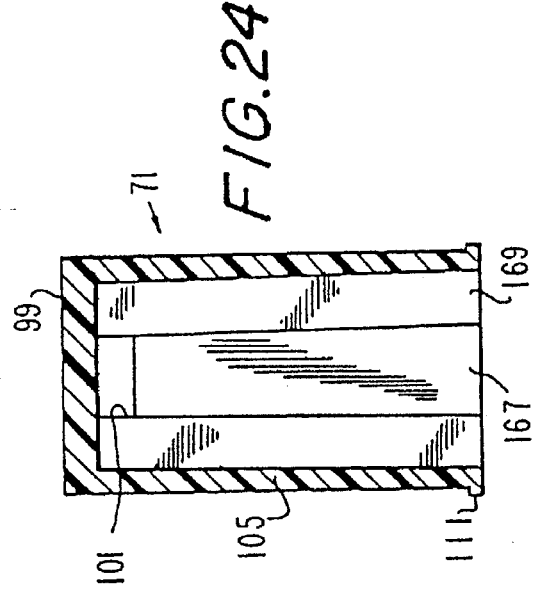
Figure 23:

FIGS. 16, 17, and 18 are details of the mounting assemblies 83 for mirrors 115. Similar mounting assemblies mount the forward facing mirrors in mount 85, as shown in FIG. 3. The mirrors have transparent faces 137 and reflective coatings 139. Edges of the faces 137 of the mirror are held against reference surfaces 141 and 143 by clips 145 and 147. Clips 147 have arms 149 that flex, and grippers 151 which grip the end of the mirrors and prevent outward sliding and which hold the mirrors against seat 153. Supports 155 and 157 on clips 145 and 147 rest against the backs of the mirrors, urging the mirrors towards reference surfaces 141 and 143.

The mirrors are inserted in a direction shown by arrow 159, and once inserted are held in place by grippers 151. The edges 67 of the triangular box-like projections rest against the backs of the mirrors when the contour plates are assemble on the shells, further holding the mirrors against the fixed reference surfaces.

FIG. 16 shows the mirror mounting structure 83 before mirrors are inserted.

FIG. 17 shows the mirror mounting structure with one mirror inserted and a second mirror being inserted.

FIG. 18 shows the structure with both mirrors inserted. The structure shown in FIGS. 16, 17, and 18 is similar to the mounting structure 85 in the shell 21, as shown in FIG. 3.

FIGS. 19 and 20 show the horizontal mounting structures 87 and 89 for mirrors 115, which have a horizontal light path extending between the mirrors. Elements in FIGS. 19 and 20 which are similar to elements in FIGS. 16, 17, and 18 have similar numbers. It can be seen that the mirrors are inserted by bending the legs 149 outward when the leading edges of the mirrors encounter the ramp edges 161 of the clips 147 and 145. The mirrors are held against reference surfaces 141 and 143 by the ribs 155 on clips 145, and ribs 157 on clips 147, and further are held against the reference surfaces by the edges 67 of the triangular box-like projections on the contour plates.

Projections 163 snap into complementary recesses in the contour plates.

FIGS. 21 through 24 show a lens holder 71 in which the side faces 165 are formed in three levels the no-draft edge surfaces 105, the middle recessed surface 167, and the intermediate tapered surfaces 169. Ledges 171 are provided near the eyepiece in 173 to prevent rearward movement of the ocular lens. The tabs of the ocular lens are held in the openings 103. Edge 175 locates and prevents inward travel of the field lens edges. Openings 101 receive the outward extending tabs on the field lens. The flanges 111 connect with interior grooves in the eyepieces. The eyepieces may be placed on the flanges either before or after the insertion of the ocular lenses.

From the foregoing, it can be appreciated that the minimum interocular distance required is function of the size of the eyepiece optical elements and when these have been set some means must be provided by which the two major assemblies which comprise the inventive binocular can be separated to meet the minimum interocular separation without falling apart while still remaining sufficiently rigid to assure proper alignment of the right and left eye paths. Without the long separation between the horizontally extending reversion mirrors in both paths, this would not be possible. Hence, this is an important part of the optical as well as mechanical design.

The present invention produces highly compact optical and binocular housings with lightweight constructions, with precise, yet relatively inexpensive lens and mirror positioning features. In addition, the present invention provides precise sliding positioning of two optical assemblies with a minimum of weight and a maximum of accuracy in maintaining optical path alignment.

Figure 25:
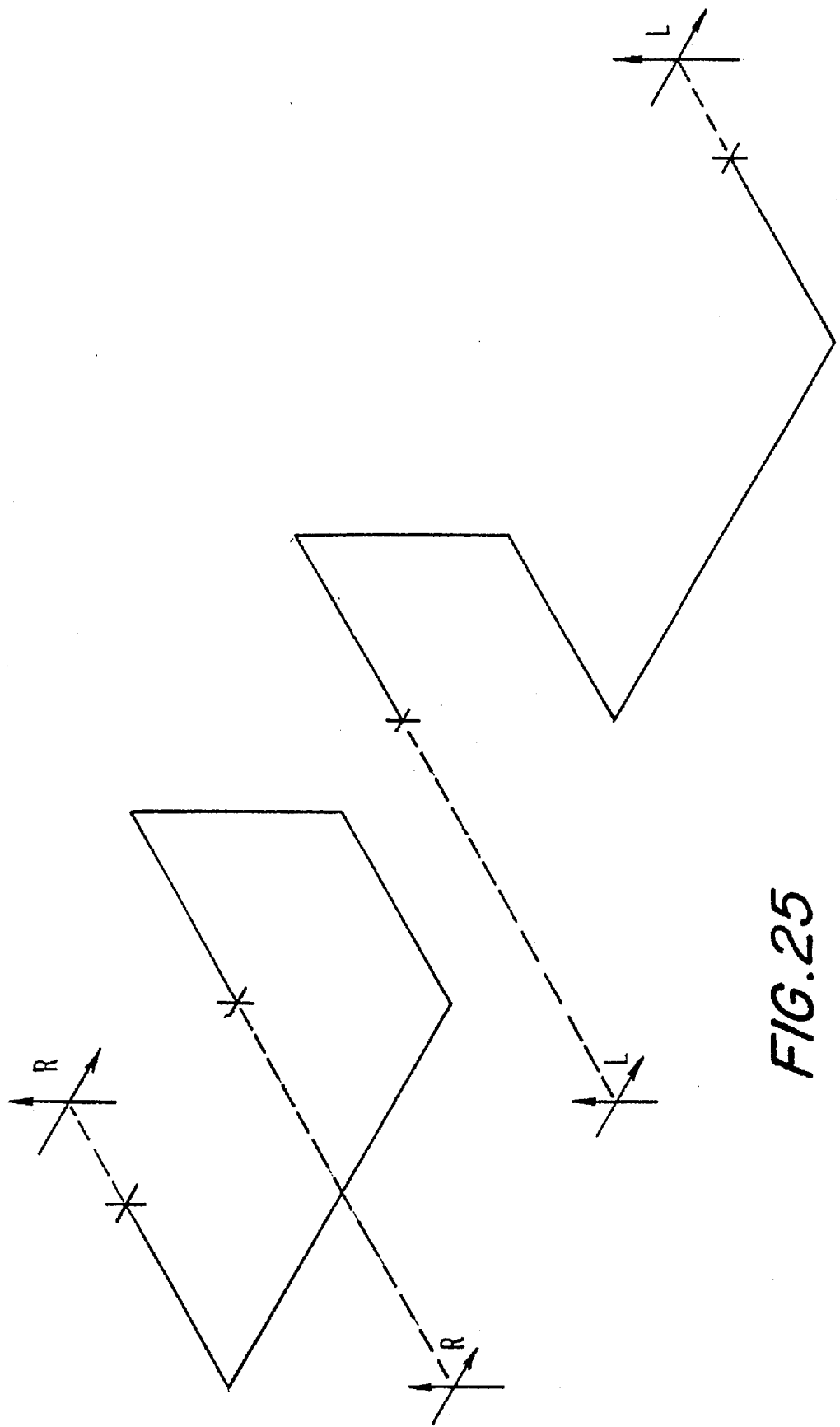
FIG. 25 is a diagrammatic perspective view showing the optical axes of an alternative folded optical arrangement for the invention.

An alternative folded optical path arrangement for the left and right eyes may be employed to practice various features of the invention like the use of rectangular fields of view along with sliding interocular distance adjustment. One such alternative is shown in FIG. 25, which shows a system in which the long reversion paths are on opposite sides of the objectives, instead of on the same side as in the preferred embodiment. It should be clear that this alternative can be rotated 180 degrees and objective and eyepiece roles reversed to arrive at yet another embodiment.

Another alternative is shown in FIGS. 26 and 27. Here, the two-mirror systems which perform the inversion and reversion are arranged differently than in preferred form. Instead of being in the sequence of inversion followed by reversion, or vice-versa, they are part inversion, reversion, and then the remainder of the inversion. Put another away, the two-mirror inversion section has been split with one of each of its elements straddling the reversion. This may be understood by referring now to FIG. 26 which shows at 180 the left side of the binocular at 198 in FIG. 27. Here, a housing 181 has disposed within it, an objective 182. This is followed by a first inversion mirror 194, then a two-mirror reversion system composed of mirrors 188 and 190, and then by a second inversion mirror 192. Finally, there is the eyepiece composed of field lens 184 and ocular 186. A nose relief area 196 is provided in housing 181.

As seen in FIG. 27, binoculars 198 consist of left optical assembly 180 as described above and right optical assembly 200, optically the mirror image of 180, which are slidably mounted to interocular adjustment plate 202.

Assembly 200 comprises an eyepiece 204, and reversion mirrors 206 and 208. A relief section 210, identical to 196, serves as an area for gripping the right eye assembly 210 to slid it with respect to assembly 180 to adjust interocular distance between eyepieces 186 and 203.

The various refractive optical elements of the invention have been of plastic in preferred form, but it should be clear that they may be of glass, whether ground and polished or molded, and possess aspheric surfaces.

While the invention has been described with reference to specific embodiments, modifications and variations of the invention may be constructed without departing from the scope of the invention, which is defined in the following claims. Therefore, it is intended that the embodiments described herein be considered as illustrative and not be construed in a limiting sense.

What is claimed is:

1. A binocular optical system comprising:
   a pair of separate housings each of which has an entrance aperture and an exit aperture; and
   each of said housings having mounted therein an objective lens registered with said entrance aperture for forming an intermediate image of an object; an eyepiece registered with said exit aperture for observing said intermediate image, and a four-mirror system for providing a multiply folded optical path between said objective lens and eyepiece for inverting and reverting said intermediate image so that it appears upright and properly oriented right to left when observed through said eyepiece, each of said four-mirror systems having a two-mirror inversion section and a two-mirror reversion section where the inversion and reversion of the images in one of said housings is in reverse order with respect to the inversion and reversion of the images in the other of said housing so that said binocular system may be made compact in size.

2. The binocular optical system of claim 1 further including means for moving said housings with respect to one another to change a distance separating said eyepieces to accommodate different user interocular distances.

3. The binocular optical system of claim 2 wherein said moving means is structured and arranged so that said housings move with respect to one another along a linear path.

4. The binocular optical system of claim 2 wherein said housings are configured and arranged to nest with respect to one another in a storage position in which the distance separating said eyepieces is at a minimum predetermined distance.

5. The binocular optical system of claim 1 wherein each of said housings and its corresponding objective lens, eyepiece, and two-mirror inversion and reversion sections provide separate optical eye assembles each of which has a field of view having a shape and wherein said shape of said field of view of each of said eye assemblies is noncircular.

6. The binocular optical system of claim 5 wherein said noncircular shape of said field of view is rectangular.

7. The binocular optical system of claim 5 further including means for moving said housings toward and away from one another along a linear path to adjust a distance between said eyepieces to accommodate different user interocular distances.

8. The binocular optical system of claim 1 wherein one of said objectives or said eyepieces in each of said housings are arranged along an optical axis for each of said housings and is adjustable either vertically or horizontally for purposes of aligning said optical axis of each housing with respect to one another.

9. The binocular system of claim 1 wherein said eyepieces are axially adjustable to set focus.

10. The binocular system of claim 1 wherein a distance between said two mirrors comprising said reverting sections is longer than a distance between said two mirrors separating said inverting sections.

11. The binocular system of claim 1 wherein both of said exit apertures of both of said housings are offset both vertically and horizontally to one side of said binocular system with respect to said entrance apertures of said housings.

12. The binocular optical system of claim 1 wherein said eyepieces are in form modified Ramsden eyepieces.

13. The binocular optical system of claim 12 wherein said eyepieces of modified Ramsden form comprise a plurality of optical elements and wherein at least one of said optical elements of said eyepieces has an aspheric surface.

14. The binocular optical system of claim 13 wherein said aspheric surface is conic.

15. The binocular optical system of claim 1 wherein said objective lens and said eyepiece are all fabricated of acrylic.

16. The binocular optical system of claim 1 wherein the magnification of said system ranges approximately from 5X to 8X and the angular field coverage from +/−2.0 to +/−5.0 degrees.

17. A binocular optical system comprising:
a pair of separate housings each of which has an entrance aperture and an exit aperture;
each of said housings having mounted therein an objective lens registered with said entrance aperture for forming an intermediate image of an object; an eyepiece registered with said exit aperture for observing said intermediate image, and a four-mirror system for providing a multiply folded optical path between said objective lens and eyepiece for inverting and reverting said intermediate image so that it appears upright and properly oriented right to left when observed through said eyepiece, each of said four-mirror systems having a two-mirror inversion section and a two-mirror reversion section that are arranged in reverse order in each of said housings so that the sequence in which images are inverted and reverted occur in reverse order in each housing; and
means for moving said housings with respect to one another along a linear path to change a distance separating said eyepieces to accommodate different user interocular distances.

18. The binocular optical system of claim 17 the two mirrors comprising said inversion section are split and straddle said two-minor reversion section.

19. The binocular optical system of claim 17 wherein said housings are configured and arranged to nest with respect to one another in a storage position in which the distance separating said eyepieces is at a minimum predetermined distance.

20. The binocular optical system of claim 17 wherein each of said housings and its corresponding objective lens, eyepiece, and two-mirror inversion and reversion sections provide separate optical eye assemblies each of which has a field of view having a shape and wherein said shape of said field of view of each of said eye assemblies is noncircular.

21. The binocular optical system of claim 20 wherein said noncircular shape of said field of view is rectangular.

22. The binocular optical system of claim 17 wherein one of said objectives or said eyepieces in each of said housings are arranged along an optical axis for each of said housings and is adjustable either vertically or horizontally for purposes of aligning said optical axis of each housing with respect to one another.

23. The binocular system of claim 17 wherein said eyepieces are axially adjustable to set focus.

24. The binocular system of claim 17 wherein a distance between said two mirrors comprising said reverting sections is longer than a distance between said two mirrors separating said inverting sections.

25. The binocular system of claim 17 wherein both of said exit apertures of both of said housings are offset both vertically and horizontally to one side of said binocular system with respect to said entrance apertures of said housings.

26. A binocular, comprised of:
a first monocular housing having an objective lens, an eyepiece, and mirrors internal of said first monocular housing defining an optical path between said objective lens and said eyepiece lens;
a second monocular housing having an objective lens, an eyepiece, and mirrors internal of said second monocular housing defining an optical path between said objective lens and said eyepiece lens;
guide means for adjustably interconnecting and supporting said first and second monocular housings for sliding movement relative to each other along a rectilinear path;
said optical path of one of said monoculars including a path portion within a plane passing through said objective lenses and extending parallel to said rectilinear path;

said optical path of the other one of said monoculars including a path portion within a plane passing through said eyepiece lenses and extending parallel to said rectilinear path;

the optical axis of each of said eyepiece lenses being arranged in a plane extending parallel to said rectilinear path and spaced from, but parallel to, the plane containing the optical axis of said respective objective lenses; whereby, said respective monocular housings can be reciprocally moved and supported between a first, initial, stored position to a second, selected extended use position in which the optical axis of the respective eyepiece lenses are spaced apart to match the interocular spacing of a user's eyes, and said optical axis of said respective objective lenses are arranged in proper position for binocular viewing of an object to be viewed, each of said first and second monocular housings including generally vertically extending, opposed proximal walls, the proximal walls of said first and second monocular housings being in juxtaposition when said first and second monocular housings are in said first position, and spaced apart when said first and said second monocular housings are in said second position, and the spacing between said first and second walls, when said first and second monocular housings are in said second position, providing an opening for the comfortable reception of the user's nose, each of said monocular housings being of a generally L-shape and are inverted and overlapped with respect to each other.

27. The binocular of claim 26, wherein each of said first and second monocular housings includes four fixed location mirrors for providing a multiple folded optical path between its objective lens and eyepiece lens for use in forming an image that is properly oriented when viewed through the eyepiece.

28. The binocular of claim 26, wherein each of said monocular housings includes an objective lens holder, which includes an adjustment means to accurately locate the objective lens for vertical and horizontal alignment of the images presented to the eyepiece lens of said first and second monocular housings.

29. The binocular of claim 28, wherein said objective lens adjustment means includes an objective lens holder which permits vertical adjustment of the objective lens prior to fixing of the objective lens in place.

30. The binocular of claim 28, wherein said objective lens adjustment means includes an objective lens holder which permits horizontal adjustment of the objective lens prior to fixing of the objective lens in place.

31. The binocular of claim 28, wherein said objective lens adjustment means includes an objective lens holder which permits vertical adjustment of the objective lens in one of said monocular housings prior to fixing of said objective lens in place and horizontal adjustment of the objective lens in the other of said monocular housings prior to the fixing of the other objective lens in place.

32. The binocular of claim 26, wherein each of said monocular housings includes an eyepiece reception means for slidably receiving the eyepiece lens along its optical axis.

* * * * *